June 25, 1963

H. V. SMITH 3,094,871

LIQUID METERING ASSEMBLY AND METHOD

Filed Sept. 12, 1957

Horace V. Smith
INVENTOR.

BY

ATTORNEYS

June 25, 1963  H. V. SMITH  3,094,871
LIQUID METERING ASSEMBLY AND METHOD
Filed Sept. 12, 1957  4 Sheets-Sheet 2
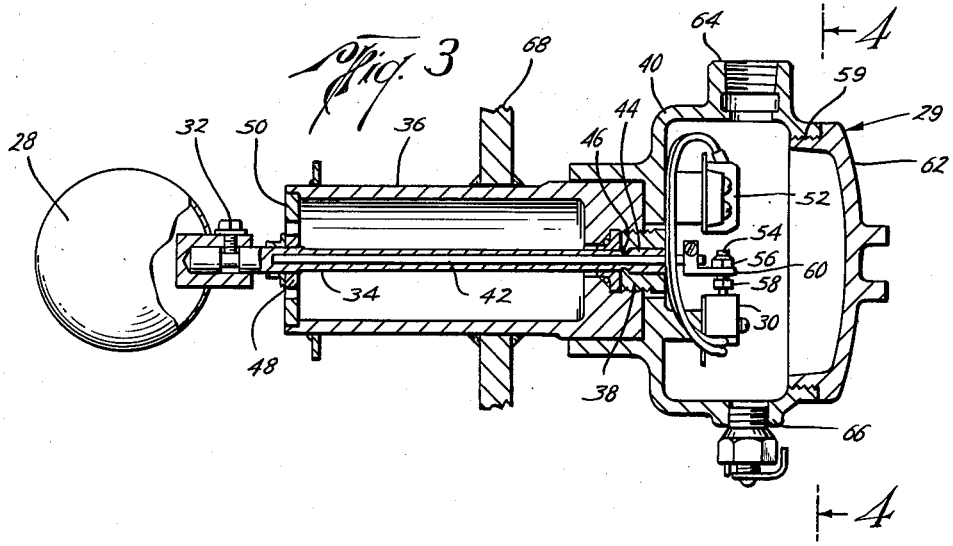
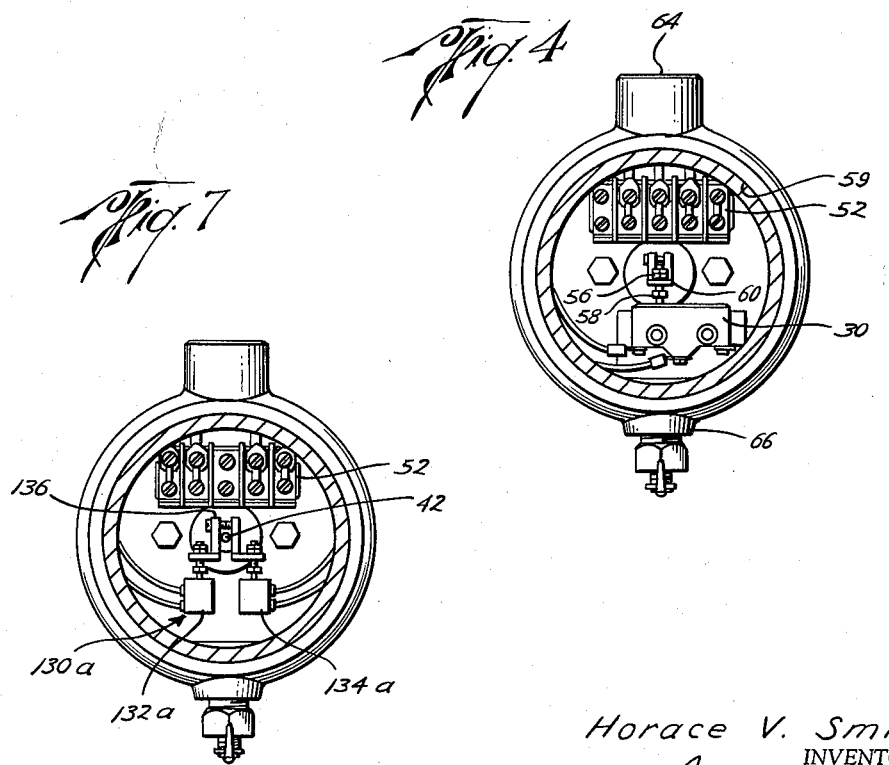
Horace V. Smith
INVENTOR.
BY
ATTORNEYS

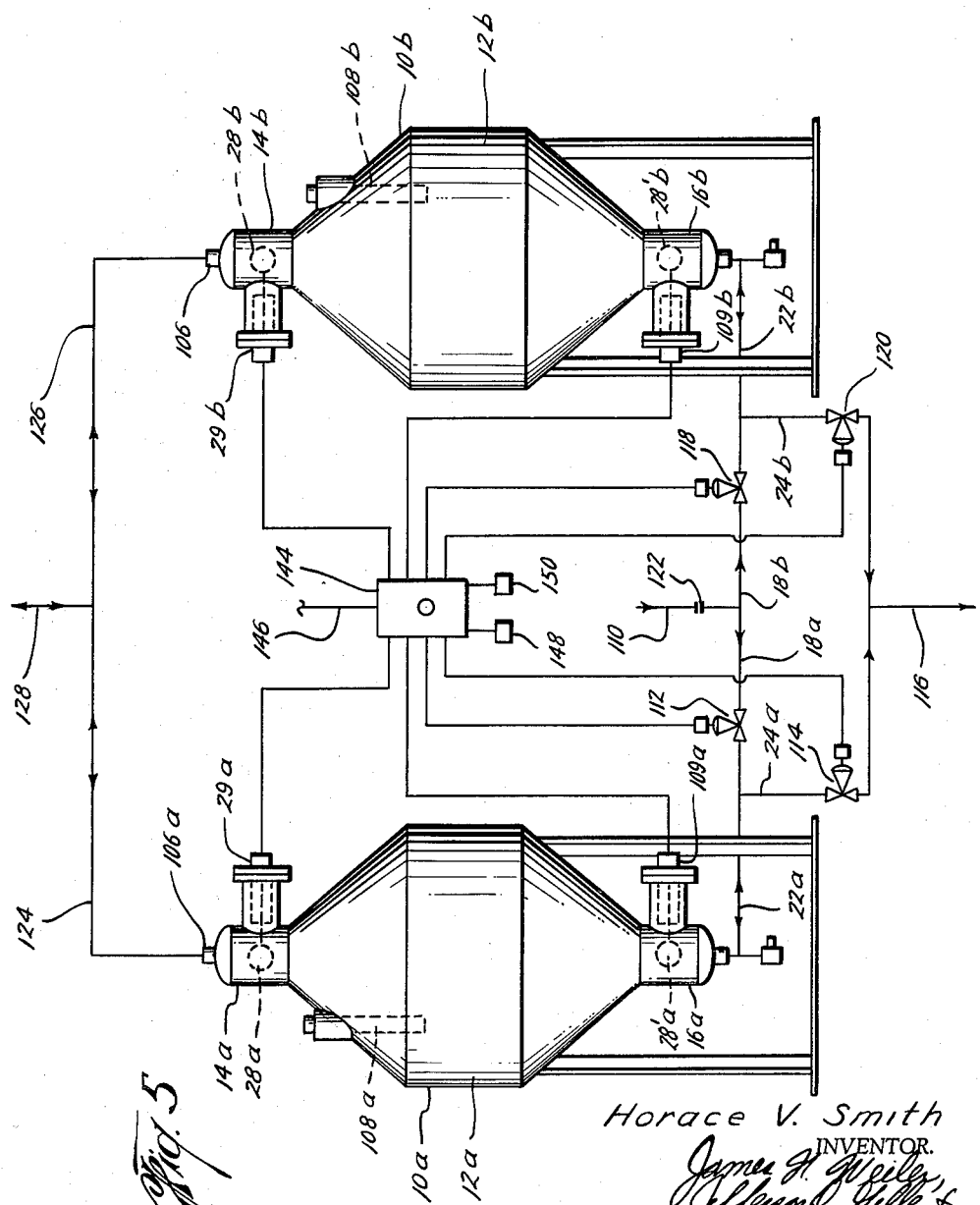

June 25, 1963     H. V. SMITH     3,094,871
LIQUID METERING ASSEMBLY AND METHOD
Filed Sept. 12, 1957     4 Sheets-Sheet 4

Horace V. Smith
INVENTOR.

BY

ATTORNEYS

United States Patent Office 3,094,871
Patented June 25, 1963

3,094,871
LIQUID METERING ASSEMBLY AND METHOD
Horace V. Smith, Houston, Tex., assignor to Oil Metering and Processing Equipment Corp., Houston, Tex., a corporation of Texas
Filed Sept. 12, 1957, Ser. No. 683,607
2 Claims. (Cl. 73—221)

This application relates to liquid metering assemblies and a method of metering liquid and more particularly to liquid metering assemblies which are electrically controlled and to a method of metering a continuously flowing stream of liquid.

There is a need for highly accurate and efficiently reliable metering vessels particularly for use in connection with metering of oil and water from oil and gas wells or gathering systems. There have been liquid metering apparatus proposed for this use; however, some of the apparatus do not function accurately when metering liquid under pressure and are not capable of accurately metering large volumes of liquid under these conditions. Some metering apparatus can function under pressure and with large volumes of flow; however, these metering apparatus are not as accurate as desired and there is a need for a more accurate and efficient reliable metering vessel particularly for use in connection with large volumes of liquid flow under pressure.

Accordingly, it is a major object of the present invention to provide an improved metering assembly which efficiently and reliably meters large volumes of liquid especially under pressure such as in connection with metering oil from oil and gas wells and gathering systems therefor and the like.

A further object of the present invention is the provision of a metering assembly utilizing upper and lower floats to control the liquid levels during filling and emptying of the assembly with such floats operating an electrical system controlling inlet and outlet valve elements.

Another object of the present invention is to provide such a metering assembly in which the internal volume of the metering vessel may be varied from the exterior of the vessel thereby providing means to calibrate the vessel by varying the volume of liquid between the upper liquid level and the lower liquid level.

Another object of the present invention is to provide a continuous flow metering assembly into which liquid may flow and be metered at a uniform rate.

Another object of the present invention is to provide a continuous flow metering assembly including a pair of metering vessels which alternate in their filling and emptying operations with the emptying vessel emptying before the filling vessel fills thereby preventing interruptions by the assembly of the flow of liquid into the assembly.

A still further object of the present invention is to provide such a continuous flow assembly as just described including an electrical system having interlocking means adapted to hold the valve elements on the draining metering vessel in a non-filling position until the filling metering vessel fills.

Another major object of the present invention is the provision of a method of metering a continuously flowing stream of liquid without interrupting the flow of this stream by directing the stream into a first liquid container until it fills, then directing the stream into a second liquid container while the first container is drained at least as fast as the second container fills, directing the stream away from the second container and into the first container when the second container fills and thereafter draining the second container at least as fast as the first container fills.

Other and further objects, features and advantages will be apparent from the following description of the presently preferred examples of the present invention, given for the purpose of disclosure and taken in conjunction with the accompanying drawings, where like character references designate like parts throughout the several views and where;

FIGURE 3 is a partly sectional side view of a float controlled switch assembly used with the liquid metering assembly of the present invention.

FIGURE 4 is a view along the lines 4—4 of FIGURE 3,

FIGURE 5 is a side elevation, partly diagrammatic, of a continuous flow metering assembly of the present invention, FIGURE 7 is an end view of a modified float controlled switch assembly used with the assembly of FIGURE 5.

Figure 1:
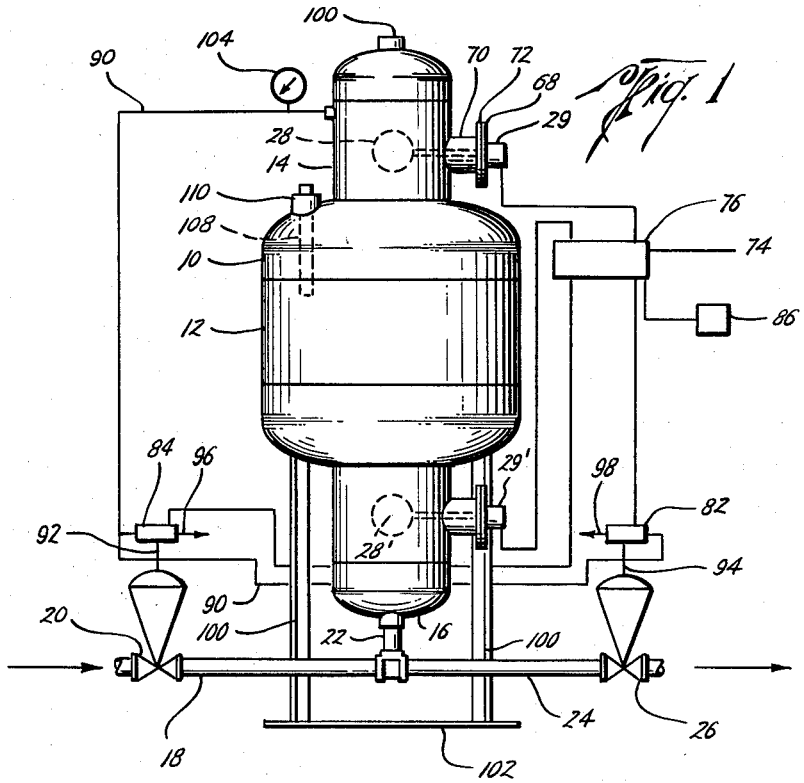
FIGURE 1 is a side elevation, partly diagrammatic, of a liquid metering assembly having a single metering vessel.

Referring now to FIGURE 1, a metering vessel or liquid container 10 is provided which has a main liquid compartment or centrally enlarged body portion 12 with upper and lower Seraphin type necks 14 and 16 respectively of reduced diameter. The reduced diameter liquid compartments or necks 14 and 16 are known in the trade as Seraphin necks in view of the discovery by T. A. Seraphin, U.S. Patent No. 1,277,760 granted September 3, 1918. The shape of the liquid container or metering vessel 10 with the enlarged main liquid compartment 12 and reduced diameter liquid compartments 14 and 16 is standard conventional practice in the art and this particular shape of metering vessel is recommended by the ASME-API Petroleum P.D. Meter Code No. 1101.

A liquid inlet line or passage 18 controlled by an inlet valve element here shown as the inlet valve 20 is connected to the flow line 22 extending into the metering vessel 10 at its lower portion. Similary, a liquid outlet line or passage 24 controlled by an outlet valve element here shown as the outlet valve 26 is connected to the flow line 22. Thus, upon simultaneous action of the valves 20 and 26 liquid, such as oil, fills and drains from the metering vessel 10.

Disposed within the upper neck 14 of the metering vessel 10 is the upper float 28 movable by buoyancy of liquid in the liquid container 10. This upper float 28 is part of an upper float controlled switch assembly 29 and operates a single pole single throw switch 30 (FIGURES 3 and 4). The upper float 28 is secured such as by the set screw 32 to a flexure tube assembly 34 secured in the tubular housing assembly 36 by the threaded flexure tube assembly retainer 38 which retainer 38 prevents the passage of fluid from the housing assembly 36 into the switch case 40 sealed on the housing assembly 36 at the retainer 38. Internally of the flexure tube assembly 34 and secured at its left end to the flexure tube assembly 34 is a flexure tube 42 which passes through the retainer 38 into the switch case 40. The retainer 38 has passageway 44 axially through it permitting passage of this flexure tube 42 through the retainer 38 and is further provided with a reduced internal diameter portion 46 forming a fulcrum on which the flexure tube 42 pivots vertically when the upper float 28 is moved vertically in response to changes of liquid level in the liquid container 10. Secured to the left end of the flexure tube 34 as viewed in FIGURE 3 is a travel stop 48 which contacts an annular shoulder 50 on the housing assembly 36 preventing stressing of the flexure tube 42 beyond its elastic limit when the upper float 28 is moved in response to changes of liquid level.

The switch 30 in the commercial unit illustrated in FIGURES 3 and 4 is a single pole double throw switch and is connected to three of the connections in the terminal strip 52. A plunger 54 having an upper adjusting nut 56 and a lower adjusting nut 58 is moved vertically by movement of the plunger connector 60 on the end of the flexure tube 42 within the case 40. Upward movement of the plunger connector 60 upon contact with the upper adjusting nut 56 moves the plunger 54 upwardly operating the switch 30 in one position and downward movement of the contact arm 60 after contacting the lower adjusting nut 58 moves the plunger 54 downwardly operating the switch 30 in another position. In the particular form of the invention illustrated in FIGURES 1 and 2 one of the leads to the terminal strip 52 is not used and the switch 30 is operated as a single pole single throw switch. Calibration of the particular liquid level at which the upper float 28 operates the switch 30 may be made by moving the adjusting nuts 56 and 58 axially along the plunger 54.

Threadedly secured as at 59 to the case 40 is a cover 62 protecting the switch 30. Upper and lower conduits 64 and 66 respectively are provided for entry of wires into the case 40. A flange 68 is provided on the housing assembly 36 so that the entire unit illustrated in FIGURES 3 and 4 may be secured in the horizontal nozzle 70 extending from the upper neck 14 by securing the the flange 68 to a matching flange 72 on the nozzle 70.

This particular float controlled switch assembly 29 is commercially available on the market at Type 2800-252V Flexure Tube Explosion Proof Switch manufactured by Fisher Governor Company, Marshalltown, Iowa, and accordingly, no further description thereof is deemed necessary. Any other type of float operated switch which will open and close a switch in response to vertical movement of a float may be used.

Located in the lower neck 16 is a lower float controlled switch assembly 29' including a switch 30' (not shown) and a lower float 28' which assembly is in all respects identical to the upper float controlled switch assembly 29, except that the switch 30' is oppositely acting to the switch 30.

Figure 2:
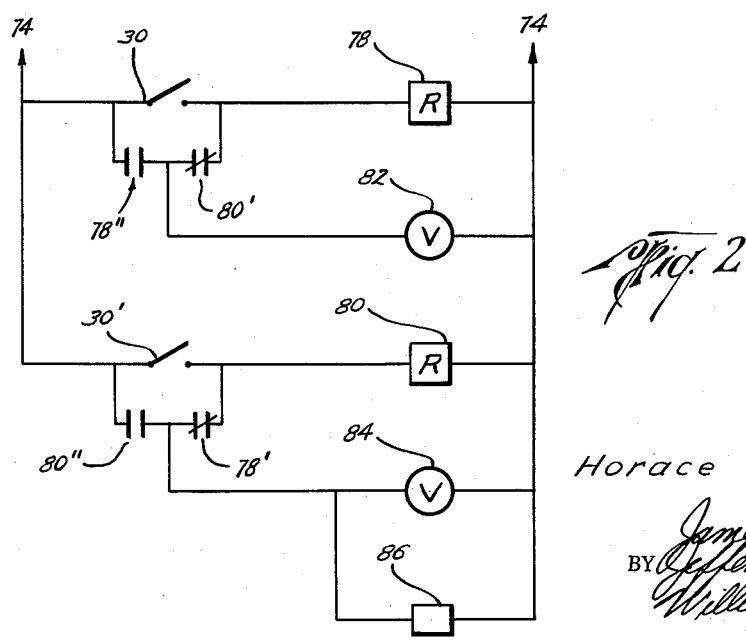
FIGURE 2 is a wiring diagram for the assembly of FIGURE 1.

Referring now to FIGURES 1 and 2 there can be seen an electrical system for controlling the inlet and outlet valves 20 and 26. Power leads 74 enter a control box 76 in which are located the relays 78 and 80 each of which relays 78 and 80 is provided with and controls two oppositely acting contact switches also located within the control box 76 but conveniently shown next to the switches 30 and 30' in the wiring diagram (FIGURE 2). Relay 78 has a normally closed contact switch 78' and a normally open contact switch 78" the former being associated with the lower float switch 30' and the latter with the upper float switch 30. Relay 80 has a normally closed contact switch 80' associated with the upper float switch 30 and a normally open contact switch 80" associated with the lower float switch 30'. Included in the circuit with the upper float switch 30 is a solenoid pilot valve 82 controlling the outlet valve 26 and included in the circuit with the lower float switch 30' is an inlet solenoid pilot valve 84 controlling the inlet valve 20. An electrically actuated counter 86 is connected across the inlet solenoid pilot valve 84. The upper float switch 30 is closed by upward movement and opened by downward movement of the upper float 28 while the lower float switch 30' is closed on downward movement and opened upon upward movement of the lower float 28'.

In operation of the electrical system of FIGURE 2, assuming the metering vessel 10 is empty, both floats 28 and 28' will be in a lower position so that the upper switch 30 is open and the lower switch 30' is closed. Upen energizing the electrical system of FIGURE 2 through the power lead 74, since the lower float switch 30' is closed, the relay 80 will be actuated which will close the contact switch 80" thus energizing the inlet solenoid pilot valve 84 causing opening of the inlet valve 20, as presently described, permitting filling of the vessel. At the same time, this relay 80 will open the contact switch 80' but this will cause no action to take place as the upper float switch 30 and the contact switch 78" are open. As the liquid level rises in the liquid container 10, the lower float 28' will rise opening the lower float switch 30', but this causes no action as the contact switches 80" and 78' are closed, thereby maintaining relay 80 energized. All switches remain in this position until the rising liquid moves the upper float 28 upwardly thereby closing the upper float switch 30. This energizes the relay 78 opening the contact switch 78' and de-energizes the relay 80. At the same time, contact switch 78" closes energizing the outlet solenoid pilot valve 82 thereby opening the outlet valve 26, as will be presently described. Since relay 80 has been deenergized in the last sequence, contact switch 80" opens thereby closing the inlet solenoid pilot valve 84 closing the inlet valve 20 and contact switch 80' also closes. The vessel then begins to drain. As the liquid is discharged from the liquid container 10 the upper float 28 moves downwardly opening the upper switch 30 but this has no effect upon the circuit as the relay 78 remains energized through the contact switches 78" and 80'. As the liquid continues to drain from the metering vessel 10 the lower float 28 is moved downward thereby closing the lower float switch 30'. This again actuates the relay 80, de-energizes the relay 78 by opening the contact switch 80, de-energizes the outlet solenoid pilot valve 82 thereby closing the outlet valve 26, and energizes the inlet solenoid pilot valve 84 thereby opening the inlet valve 20. The liquid will then again flow into the metering vessel 10 and the sequence will be repeated. Each time the inlet solenoid pilot valve 84 is energized the counter 86 will also be energized actuating it and recording the number of times the metering vessel 10 empties and fills.

A fluid pressure line 90 from the upper reduced neck 14 is connected to the inlet solenoid pilot valve 84 and to the outlet solenoid pilot valve 82. The inlet valve 20, which is a pressure responsive valve, is connected by a short pressure line 92 to the inlet solenoid pilot valve 84 and similarly the outlet valve 26, which is also a pressure responsive valve, is connected by a short pressure line 94 to the outlet solenoid pilot valve 82. Each of these particular inlet and outlet valves 20 and 26 is normally closed, is opened by the application of pressure, and is closed when pressure is bled from it.

Each of the solenoid pilot valves 84 and 82 is a three-way normally closed pilot valve including the exhaust 96 for the inlet solenoid pilot valve 84 and the exhaust 98 for the outlet solenoid pilot valve 82. When the inlet solenoid pilot valve 84 is electrically energized it opens so pressure from the pressure line 90 passes through it into the pressure line 92 opening the inlet valve 20 and de-energizing the inlet solenoid pilot valve 84 moves the valve to close it to the passage of gas from the pressure line 90 but permits the drainage of back pressure in line 92 out the exhaust 96. The outlet solenoid pilot valve 82 is similarly actuated.

The three-way solenoid pilot valves 82 and 84 may be of any preferred type of which several are readily available on the commercial market. A satisfactory solenoid pilot valve is Model X5M-8700 three-way explosion proof electric solenoid valve manufactured by Skinner Electric Valve Division, The Skinner Chuck Company, New Britain, Connecticut.

The inlet and outlet valves 20 and 26 may be of any perferred type of pressure responsive valve such as the well known diaphragm motor valve and accordingly no further description of the them is necessary.

The liquid container 10 may be supported by any suitable framework or structure and, for this purpose, the supports 100 connected to the liquid container 10 and the base 102 are illustrated. A pressure gauge 104 may be provided in the gas pressure line 90 and a gas equalizing connection 106 provided for a line to equalize the pressure in the liquid container 10 upon filling and emptying of the container.

To further calibrate the liquid container 10 in addition to the calibration provided by adjustment of the upper and lower float controlled switch assemblies 29 and 29', or in lieu thereof, a closed tube 108 is slidably inserted into the liquid container 10 through a stuffing box 110. Thus movement of the closed tube 108 into and out of the metering vessel 12 changes the metered volume between the upper and lower floats 28 and 28'.

In operation of the assembly of FIGURE 1, liquid is permitted to enter the inlet line 18 when the inlet valve 20 is open which liquid flows into the interior of the liquid container 10 through the flow line 22, the outlet valve 26 being closed. As this occurs the lower float 28' is moved upwardly without any effect upon the inlet and outlet valves 20 and 26 respectively and as the liquid level rises it will contact the upper float 28 moving it upwardly actuating the inlet pilot solenoid valve 84 to a position where the gas pressure on the pressure responsive inlet valve 20 is drained out the exhaust 96 closing the inlet valve 20 and simultaneously the outlet solenoid pilot valve 82 is actuated to a position where gas pressure from the pressure line 90 is supplied to the outlet valve 26 opening it. As the liquid level descends, because of the closed inlet valve 20 and open outlet valve 26, the outlet solenoid pilot valve 82 continues to be energized and open permitting pressure to hold the outlet valve 26 open until the liquid level allows the lower float 28' to fall thereby de-energizing the outlet solenoid pilot valve 82 and energizing the inlet solenoid pilot valve 84 simultaneously thereby permitting back pressure from the pressure line 94 connected to the outlet valve 26 to drain closing the outlet valve 26 and simultaneously permitting pressure in the gas pressure line 90 to open the inlet valve 20. When this occurs the liquid level in the liquid container 10 begins to rise repeating the cycle. Each time the inlet pilot solenoid valve 84 is energized opening the inlet valve 20 the counter 86 is actuated providing a count of the number of times the liquid container 10 empties and fills.

While the structure of FIGURE 1 has been described as operating at above atmospheric pressure, it may be in certain instances that the structure will be operated at atmospheric pressure or less in which event extraneous gas at suitable pressure may be supplied to the gas pressure line 90 for actuation of the inlet and outlet valves 20 and 26.

Figure 6:
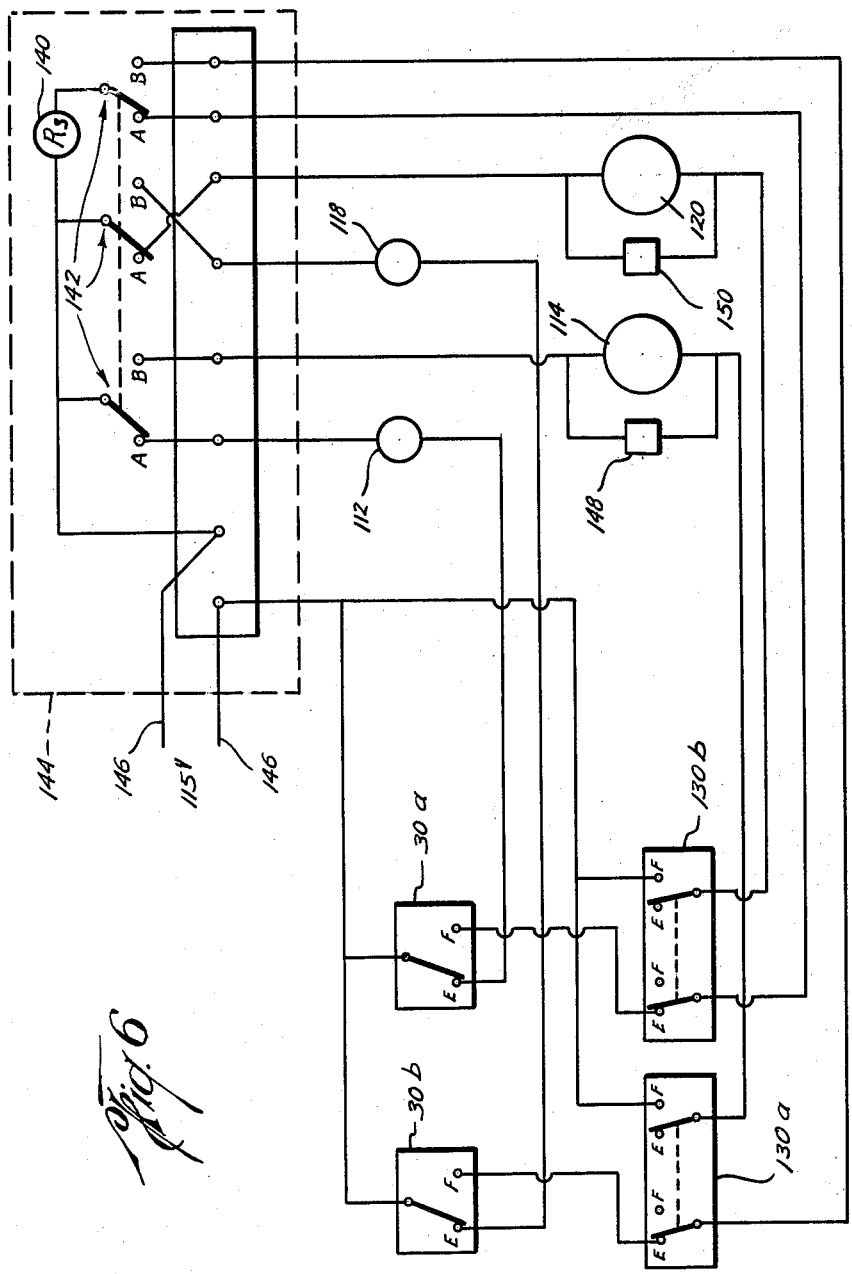
FIGURE 6 is a wiring diagram for the assembly of FIGURE 5.

Referring now to FIGURES 5 and 6 there is illustrated a continuous flow assembly utilizing two metering vessels 10a and 10b which alternately fill and empty with the emptying vessel emptying before the filling vessell fills so there may be a continuous flow of liquid into the assembly. Those parts associated with the lefthand metering vessel 10a have the suffix "a" and those associated with the righthand metering vessel 10b have the suffix "b."

The metering vessels 10a and 10b are in all respects identical to each other and to the metering vessel 10. Certain modifications, later explained, have been made in the float controlled switch assemblies 29a, 109a, 29b and 109b from the float controlled switch assemblies 29 and 29' of FIGURES 3 and 4. A common supply line 110 supplies liquid to the inlet line 18a for the metering vessel 10a and to the inlet line 18b to the metering vessel 10b. The liquid inlet line 18a controlled by the inlet valve 112 is connected to the flow line 22a of metering vessel 10a at its lower portion and a liquid outlet line 24a controlled by the outlet valve 114 is also connected to the flow line 22a. This liquid outlet line 24a connects to a common drain line 116. The inlet line 18b controlled by the inlet valve 118 connects to the flow line 22b extending into the lower portion of the metering vessel 10b and the liquid outlet line 24b controlled by the outlet valve 120 also connects to the common drain line 116. Thus, upon the inlet valve 112 being opened and the outlet valve 114 being closed while the inlet valve 118 is closed and the outlet valve 120 is open liquid from the common supply line 110 will enter the metering vessel 10a and liquid within the metering vessel 10b will drain out the common drain 116. Upon a reversal of all of the valves 112, 114, 118 and 120, liquid in the metering vessel 10a will drain out the common drain 116 and liquid entering the common supply line 110 will fill the metering vessel 10b.

Means are provided to insure that the emptying vessel, either 10a or 10b, will empty before the filling vessel, either 10b or 10a, fills such as by a restriction 122 in the common supply line 110 so that liquid will drain from the metering vessels 10a and 10b quicker than it fills these same vessels. This liquid flow control means thus insures a continuous flow of liquid into the metering assembly illustrated in FIGURE 5. A gas equalizing line 124 on the metering vessel 10a and a similar gas equalizing line 126 from the metering vessel 10b connect to a common gas pressure equalizing line 128 to equalize pressure during the flow of liquid into and out of the metering vessels 10a and 10b.

Referring now to FIGURE 6 there can be seen a wiring diagram for an electrical system to control the operation of the inlet and outlet valves. The switches 30a and 30b in the float control switch assemblies 29a and 29b are used as single pole double throw switches rather than as single pole single throw switches as the switch 30 was used in FIGURE 2. FIGURE 7 illustrates a modified lower float controlled switch assembly 109a for the metering vessel 10a which is identical to 109b of metering vessel 10b and differs from the float controlled switch assembly 29 illustrated in FIGURES 3 and 4 only in the switch. A double single pole single throw switch 130a constructed of two single pole single throw switches 132a and 134a connected by a yoke 136 for simultaneous actuation by the flexure tube 42 is used. Other than this the float controlled switch assemblies 109a and 109b are identical to float controlled switch assembly 29.

The inlet and outlet valves 112, 114, 118 and 120 of FIGURE 5 and FIGURE 6 instead of being pressure responsive valves as illustrated in FIGURE 1 are normally closed electric motor two-way inlet and outlet valves. These electric motor inlet and outlet valves are directly actuated by this electrical system of FIGURE 6 and no gas pressure is necessary. Such electric motor two-way valves are readily available commercially and a satisfactory valve is General Control Hydromotor Valve, Catalog No. H-2V1A1A4 manufactured by General Controls Co., Glendale, California, and accordingly no further description of such inlet and outlet valves 112, 114, 118 and 120 is necessary.

The electrical system of FIGURE 6 also includes an impulse relay 140 which controls a triple-ganged switch 142 located in the control box 144.

In operation of the electrical system of FIGURE 6, assuming both metering vessels 10a and 10b are empty, all the floats 28a, 28'a, 28b and 28'b will be in the down position, the switches 30a, 30b, 130a, and 130b will be in the E position, and all inlet and outlet valves are closed. The triple ganged switch 142 as shown has its contacts in position A and thus will cause the metering vessel 10a to fill first. If metering vessel 10b is desired to be filled first, the impulse relay 140 may be manually set with the triple ganged switch 142 in the B position. With the triple ganged switch 142 in position A, the automatic operation is initiated by supplying the circuit with power from the power leads 146. At this point the only circuit that is actuated is through the inlet valve 112 of metering vessel 10a, which energizes the inlet valve 112 opening it permitting liquid to flow into the metering vessel 10a. As metering vessel 10a begins to fill the lower float 28'a rises causing the double single pole single throw switch 130a to move to the F position. This action does not energize anything as the three ganged switch 142 is in position A. Metering vessel 10a continues to fill until the liquid raises the upper float 28a causing the upper switch 30a to move to position F. This energizes the impulse relay 140 causing the three ganged switch 142 to move to position B deenergizing inlet valve 112 thus stopping the inflow to metering vessel 10a. At the same time the inlet valve 118 of metering vessel 10b and the outlet valve 114 of metering vessel 10a are energized opening them causing metering vessel 10b to begin to fill and metering vessel 10a to begin to empty. At this point outlet valve 120 of metering vessel 10b remains closed. As metering vessel 10b begins to fill the lower float 28'b rises moving the double single pole single throw float switch 130b to the F position which energizes nothing as the triple ganged switch 142 is in the B position. At the same time the liquid recedes from vessel 10a and the float 28a moves downwardly moving the switch 30a to the E position which actuates no part of the circuit since the triple ganged switch 142 is still in the B position. When metering vessel 10a empties, the float 28'a lowers thus moving the float switch 130a to the E position de-energizing the outlet valve 114 of metering vessel 10a causing it to close. Later, when metering vessel 10b fills, the float 28b rises moving the float switch 30b to the F position energizing the impulse relay 140 causing movement of the triple ganged switch 142 to position A. This movement of the triple ganged switch 142 energizes the inlet valve 112 of metering vessel 10a causing metering vessel 10a to fill again, de-energizes the inlet valve 118, and energizes the outlet valve 120 of metering vessel 10b causing metering vessel 10b to empty. This operation continues with one metering vessel filling at the same time the other one empties.

A pair of electrically actuated counter 148 and 150 are used with one being electrically connected across each of the outlet valves 114 and 120 so that each time the outlet valves are energized to drain the metering vessels 10a and 10b the counters 148 and 150 are actuated providing an accurate count of the number of times each vessel 10a and 10b empties.

The operation of the continuous flow assembly of FIGURE 5, assuming both metering vessels 10a and 10b are empty and metering vessel 10a is to be filled first, is as follows: In metering vessel 10a inlet valve 112 is open and outlet valve 114 is closed while both the inlet valve 118 and outlet valve 120 of metering vessel 10a are closed so liquid entering through the common supply line 110 will pass into metering vessel 10a until the vessel 10a is filled whereupon all such valves except outlet valve 120 on metering vessel 10b will simultaneously reverse their operation so that inlet valve 118 of metering vessel 10b is open and the outlet valve 120 remains closed permitting filling of the metering vessel 10b while inlet valve 112 of metering vessel 10a is closed and the outlet valve 114 is open so that liquid in vessel 10a drains out the common drain line 116. Upon vessel 10a emptying, which will occur before vessel 10b fills, because of the restriction 122 in the common supply line 110, outlet valve 114 closes but no opening of the inlet valve 112 for the vessel 10a takes place. At the instant metering vessel 10b fills valve 112, 118, and 120 reverse their position so that inlet valve 118 is closed and outlet valve 120 of metering vessel 10b is open allowing liquid in metering vessel 10b to drain out the common drain line 116 while inlet valve 112 of metering vessel 10a is open and the outlet valve 120 remains closed filling the metering vessel 10b repeating the sequence.

It should be noted that in this sequence the draining vessel always empties before the filling vessel fills and the electrical system closes the outlet valve of the draining vessel after it drains before that vessel begins to fill.

While the inlet and outlet valves 112, 114, 118 and 120 of FIGURE 5 are illustrated as electric motor valves, the pressure responsive valves, solenoid operated pilot-valves, and the gas supply of FIGURE 1 may, of course, be utilized. Likewise the electric motor valves of FIGURE 5 may be utilized in the assembly of FIGURE 1.

It is believed that the method of the invention is apparent from the foregoing description of a presently preferred liquid metering assembly having alternate filling and draining liquid containers for measuring a continuously flowing stream of liquid. This method comprises in general directing a continuously flowing stream of liquid into the first liquid container until it fills to a predetermined upper level, draining liquid from the second container during the filling of the first container at such a rate that the liquid in the second container drains to a predetermined low level at least as soon as the liquid in the first container reaches its predetermined upper level, stopping the draining of liquid from the second container when it reaches the predetermined low level in that second container, directing the stream away from the first container and into the second container when the liquid in the first container fills it to its predetermined upper level, draining liquid from the first liquid container during filling of the second container at such a rate that the liquid in the first container drains to a predetermined low level at least as soon as the liquid in the second container fills it to its predetermined upper level, stopping the draining of liquid from the first container when it reaches the predetermined low level in the first liquid container, and directing the stream away from the second container and into the first container when the liquid in the second container reaches its predetermined upper level so that the continuously flowing stream of liquid is directed, without interruption, from one metering container to the other in such a series of steps that the stream is metered without interruption.

While the present invention has been described in connection with metering oil and gas, it will be understood that the invention may be used for metering any type of liquid under any and all pressure conditions and in combination with various other apparatus. In addition, rearrangements and substitution of parts will suggest themselves to those skilled in the art and such are encompassed within the spirit of the invention and the scope of the appended claims.

The invention therefore is well suited to carry out the objects and attain the advantages and ends mentioned as well as others inherent therein. Accordingly, the invention is to be limited only by the spirit thereof and the scope of the appended claims.

What is claimed is:

1. A metering assembly having alternate filling and draining liquid containers for measuring a flow of liquid through the assembly, said assembly including, first and second liquid containers, inlet and outlet flow lines connected to each liquid container, an inlet and an outlet electrical controlled valve element in the flow lines of each container, an upper float in an upper portion of each liquid container and a lower float in a lower portion of each liquid container, said floats movable by buoyancy of liquid in the liquid containers, an electrical switch connected to each float, each switch opening upon movement of its float in one direction and closing upon movement of its float in the other direction, an interlocking relay, a triple ganged double throw contact switch controlled by said relay and changing position on actuation of said relay, two interlocking relay actuation circuits connected to one of the double throw contact switches, one of said circuits connected to the bottom float switch of the first container and to the top float switch of the second container while the second circuit is connected to the bottom float switch of the second container and the top float switch of the first container whereby the relay is actuated by the floats and switches connected to the floats each time one of the containers is emptied and the other is filled, said inlet and outlet valve control elements being connected to the second and third double throw contact switches, the inlet valves being connected to opposite contacts of said second and third double throw switches and the outlet valves being connected to opposite contacts of the second and third double throw switches whereby simultaneously one container commences filling and the other commences emptying.

2. The invention of claim 1 including liquid flow control means permitting more rapid draining than filling of each liquid container thereby insuring a continuous inflow through the metering assembly.

References Cited in the file of this patent

UNITED STATES PATENTS

| | | |
|---|---|---|
| 879,263 | Heissenberger | Feb. 18, 1908 |
| 2,794,342 | Franklin | June 4, 1957 |
| 2,817,967 | Meyers | Dec. 31, 1957 |
| 2,831,350 | Banks et al. | Apr. 22, 1958 |

FOREIGN PATENTS

| | | |
|---|---|---|
| 765,258 | France | Mar. 19, 1934 |

OTHER REFERENCES

Where Do We Stand Today on Automatic Custody Transfer, Oil and Gas Journal, June 11, 1956, vol. 54, No. 58 (pages 110 to 114) (pages 113 and 114 pertinent). Copy in Scientific Library.